United States Patent
Katsuki et al.

(10) Patent No.: US 11,023,817 B2
(45) Date of Patent: Jun. 1, 2021

(54) PROBABILISTIC ESTIMATION OF NODE VALUES

(71) Applicant: INTERNATIONAL BUSINESS MACHINES CORPORATION, Armonk, NY (US)

(72) Inventors: Takayuki Katsuki, Tokyo (JP); Michiharu Kudoh, Kanagawa-ken (JP); Hiroaki Nakamura, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 15/492,368

(22) Filed: Apr. 20, 2017

(65) Prior Publication Data
US 2018/0307996 A1    Oct. 25, 2018

(51) Int. Cl.
*G06N 7/00*    (2006.01)
*G06N 5/02*    (2006.01)

(52) U.S. Cl.
CPC ............. *G06N 7/005* (2013.01); *G06N 5/022* (2013.01)

(58) Field of Classification Search
CPC ................................ G06N 7/005; G06N 5/022
See application file for complete search history.

(56) References Cited

U.S. PATENT DOCUMENTS

| | | | |
|---|---|---|---|
| 2004/0205711 A1* | 10/2004 | Ishimitsu | G06F 9/451 717/116 |
| 2011/0238603 A1 | 9/2011 | Peoples et al. | |
| 2012/0084239 A1 | 4/2012 | Cox et al. | |

FOREIGN PATENT DOCUMENTS

| | | |
|---|---|---|
| JP | 2014225176 A | 12/2014 |
| WO | 2015071968 A1 | 5/2015 |

OTHER PUBLICATIONS

Koiter, Visualizing Inference in Bayesian Networks , 2006, TUDelft (Year: 2006).*
Shachter, R.D., "Bayes-Ball: The Rational Pastime (for Determining Irrelevance and Requisite Information in Belief Networks and In°uence Diagrams)" Proceedings of the Fourteenth Conference on Uncertainty in Artificial Intelligence (Jan. 2013) pp. 1-9.

(Continued)

*Primary Examiner* — Benjamin P Geib
(74) *Attorney, Agent, or Firm* — Tutunjian & Bitetto, P.C.; Randall Bluestone

(57) ABSTRACT

A method including receiving designation of an input node for which a node value is generated from collected data, an option node to which a node value is arbitrarily provided, and an estimation target node to be a target of a node value estimation, in a graph including nodes and directional edges; and identifying a directional edge for which a conditional probability is to be acquired to measure the node value of the estimation target node, from among the directional edges, by traversing a directional edge that can propagate an effect to a node value from the estimation target node. The identifying includes, for the option node, traversing both a directional edge that can propagate an effect if a node value is provided to the option node and a directional edge that can propagate an effect if a node value is not provided to the option node.

8 Claims, 9 Drawing Sheets

(56) References Cited

OTHER PUBLICATIONS

Mohan et al., "Graphical models for inference with missing data." Advances in neural information processing systems, vol. 26. Nov. 1, 2013. pp. 1277-1285.
Santos et al., "A New Algorithm for Generating Situation-Specific Bayesian Networks Using Bayes-Ball Method." Proceedings of the 12th International Workshop on Uncertainty Reasoning for Semantic Web. Oct. 17, 2016. pp. 36-48.
Office Action with cited art in corresponding U.S. Appl. No. 15/804,256 dated Jan. 7, 2021 (pp. 1-19).

* cited by examiner

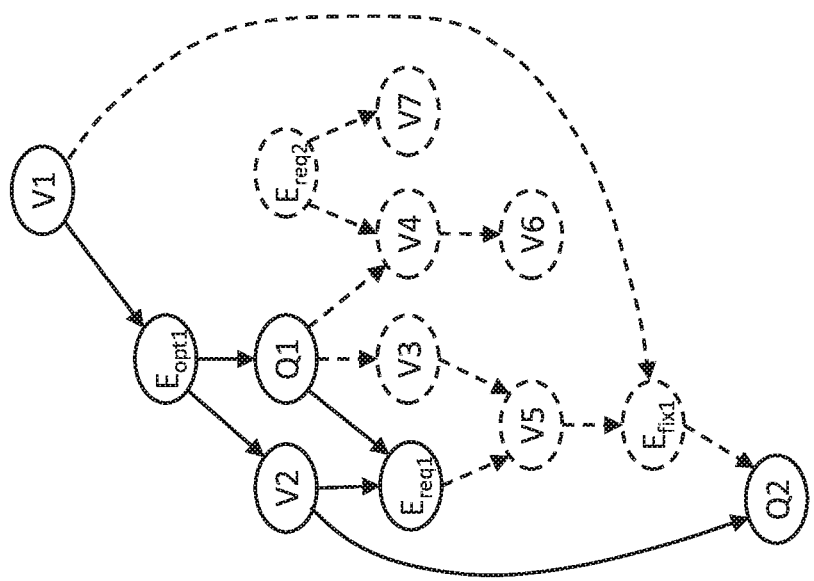
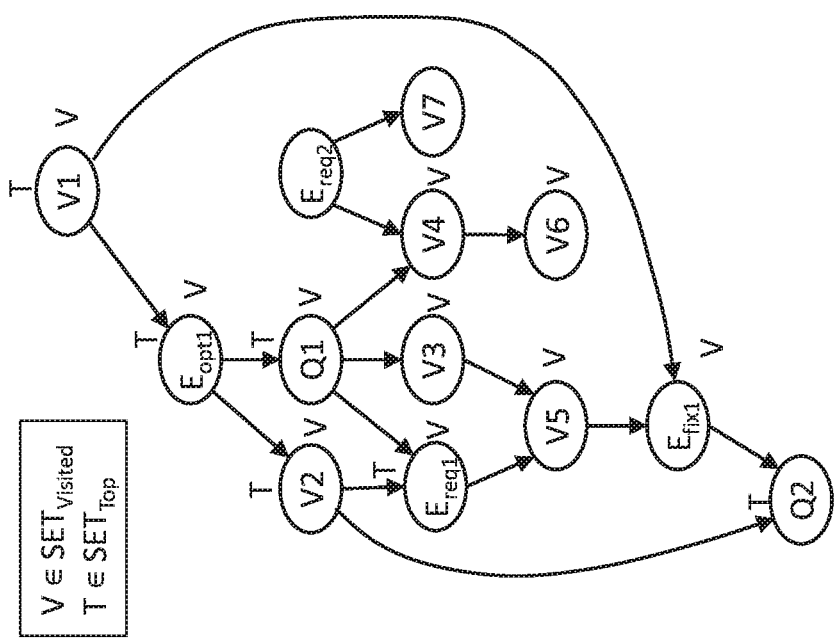
FIG. 4

| GRAPH STRUCTURE | SERIAL A→B→C | | | | DIVERGING A←B→C | | | | CONVERGING A→B←C | | | |
|---|---|---|---|---|---|---|---|---|---|---|---|---|
| IS THERE EVIDENCE FOR B? | NO | | YES | | NO | | YES | | NO | | YES | |
| DOES THE EFFECT PROPAGATE TO A NODE VALUE? | YES | | NO | | YES | | NO | | NO | | YES | |
| PROPAGATION SOURCE | CHILD | PARENT | CHILD | PARENT | CHILD | CHILD | CHILD | CHILD | PARENT | PARENT | PARENT | PARENT |
| PROPAGATION DESTINATION | PARENT | CHILD | - | - | CHILD | CHILD | - | - | - | - | PARENT | PARENT |
| NUMBER | 1 | 2 | 3 | 4 | 5 | 5 | 6 | 6 | 7 | 7 | 8 | 8 |

FIG. 5

A: *for each* $V \in \mathbf{SET}_{Vcpt}$
B: $m := M(V)$
C: $\mathbf{SET}_m := \{M(V_1), ..., M(V_n)\}$ where $\{V_1, ..., V_n\} = parents(V) \setminus \mathbf{SET}_{Efix}$
   $\mathbf{SET}_T := \{T \in \mathbf{SET}_T \mid \{m\} \cup \mathbf{USET}_m \subseteq attributes(T)\}$
D: *if* there exists a $T \in \mathbf{SET}_{T'}$
   $\mathbf{SET}_c := attributes(T)$
   $\mathbf{SET}_n := cells(T)$
E: *for each* combination of $m_k$ and $\mathbf{SET}_{ml}$, where $m_k$ is a value of $m$ and $\mathbf{SET}_{ml}$ is a value pattern of $\mathbf{SET}_m$ $$p(m_k | \mathbf{SET}_{ml}) := \frac{\sum_{\mathbf{SET} \setminus (\{m\} \cup \mathbf{USET}_m)} select(\mathbf{SET}_n, (\{m_k\} \cup \mathbf{USET}_{ml}))}{\sum_{\mathbf{SET}_c \setminus \mathbf{SET}_m} select(\mathbf{SET}_n, \mathbf{SET}_{ml})} \quad (1)$$

F: $\mathbf{SET}_{CPT} := \mathbf{SET}_{CPT} \cup \{p(m | \mathbf{SET}_m)\}$

*FIG. 6*

| ACS SAMPLE DATA ATTRIBUTE V | COLLECTED TABULATED ITEMS M(v) |
|---|---|
| SEX (SEX) | MALE/FEMALE |
| SCHL (EDUCATIONAL ATTAINMENT) | EDUCATION LEVEL |
| AGEP (AGE) | AGE |
| MAR (MARITAL STATUS) | MARITAL STATUS |
| RELP (RELATIONSHIP) | RELATIONSHIP TO HEAD OF HOUSEHOLD |
| ESR (EMPLOYMENTS STATUS RECORDE) | EMPLOYMENT STATUS |
| ... | ... |

|  |  | MALE | | | | FEMALE | | | |
|---|---|---|---|---|---|---|---|---|---|
|  |  | UNMARRIED | MARRIED | WIDOWED | DIVORCED | UNMARRIED | MARRIED | WIDOWED | DIVORCED |
| JAPANESE | HOKKAIDO 15-19 | 98,946 | 353 | 8 | 28 | 95,307 | | | |
| | 20-24 | 96,604 | 6,514 | 28 | 294 | 92,850 | | | |
| | ... | ... | ... | ... | ... | ... | | | |
| | AOMORI PREFECTURE 15-19 | 15,749 | 35 | 2 | 1 | 15,944 | | | |

FIG. 8

$$p(m_k | SET_{mi}) = \frac{\sum_{NATIONALITY, REGION} n(SEX=MALE, AGE=15-19, MARITAL\ STATUS=UNMARRIED, NATIONALITY, REGION)}{\sum_{MARITAL\ STATUS, NATIONALITY, REGION} n(SEX=MALE, AGE=15-19, MARITAL\ STATUS, NATIONALITY, REGION)}$$

FIG. 9

| SEX AGE MAR | P (MAR|SEX, AGE) |
|---|---|
| MALE 15-19 UNMARRIED | 0.9905 |
| MALE 15-19 MARRIED | 0.0031 |
| ... | ... |
| FEMALE 85- WIDOWED | 0.7860 |
| FEMALE 85- DIVORCED | 0.0257 |

FIG. 10

PROBABILISTIC ESTIMATION OF NODE VALUES

BACKGROUND

Technical Field

The present invention relates to probabilistic estimation of node values, and more particularly to simplification of probabilistic estimation of node values using graph acquisition and summary statistical tables.

Related Art

Conventionally, technology is being developed to estimate node values by using conditional probabilities of directional edges in a graph including a plurality of nodes and directional edges between node values, as shown in, for example, Ross D. Shachter: Bayes-Ball: The Rational Pastime (for Determining Irrelevance and Requisite Information in Belief Networks and Influence Diagrams), *Proceedings of the Fourteenth Conference in Uncertainty in Artificial Intelligence,* 1998

In recent years, there is a desire to simplify the estimation of node values.

SUMMARY

According to a first aspect of the present invention, provided is a method comprising graph acquisition of acquiring a graph that includes a plurality of directional edges indicating a dependency relationship among a plurality of nodes and node values; designation reception of receiving a designation of a required node for which a node value is always required, an option node to which a node value is arbitrarily provided, and an estimation target node that is to be a target of an estimation of a node value, among the plurality of nodes; and identification of identifying a directional edge for which a conditional probability is to be acquired to measure the node value of the estimation target node, from among the plurality of directional edges, by traversing a directional edge that can propagate an effect to a node value from the estimation target node, in at least one of a forward direction and a backward direction, wherein the identification includes, for the option node, traversing both a directional edge that can propagate an effect if a node value is provided to the option node and a directional edge that can propagate an effect if a node value is not provided to the option node.

According to a second aspect of the present invention, provided is one or more computer readable storage mediums collectively storing program instructions that are executable by a computer to cause the computer to perform operations comprising graph acquisition of acquiring a graph that includes a plurality of directional edges indicating a dependency relationship among a plurality of nodes and node values; designation reception of receiving a designation of a required node for which a node value is always required, an option node to which a node value is arbitrarily provided, and an estimation target node that is to be a target of an estimation of a node value, among the plurality of nodes; and identification of identifying a directional edge for which a conditional probability is to be acquired to measure the node value of the estimation target node, from among the plurality of directional edges, by traversing a directional edge that can propagate an effect to a node value from the estimation target node, in at least one of a forward direction and a backward direction, wherein the identification includes, for the option node, traversing both a directional edge that can propagate an effect if a node value is provided to the option node and a directional edge that can propagate an effect if a node value is not provided to the option node.

The summary above does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 4 shows example processing results from the identification stage.

FIG. 5 shows the principles of the identification stage.

FIG. 6 shows an exemplary process in the determination stage.

FIG. 8 shows exemplary statistical data.

FIG. 9 shows an exemplary calculation of Expression 1 in the determination stage.

FIG. 10 shows an exemplary conditional probability table determined in the determination stage.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
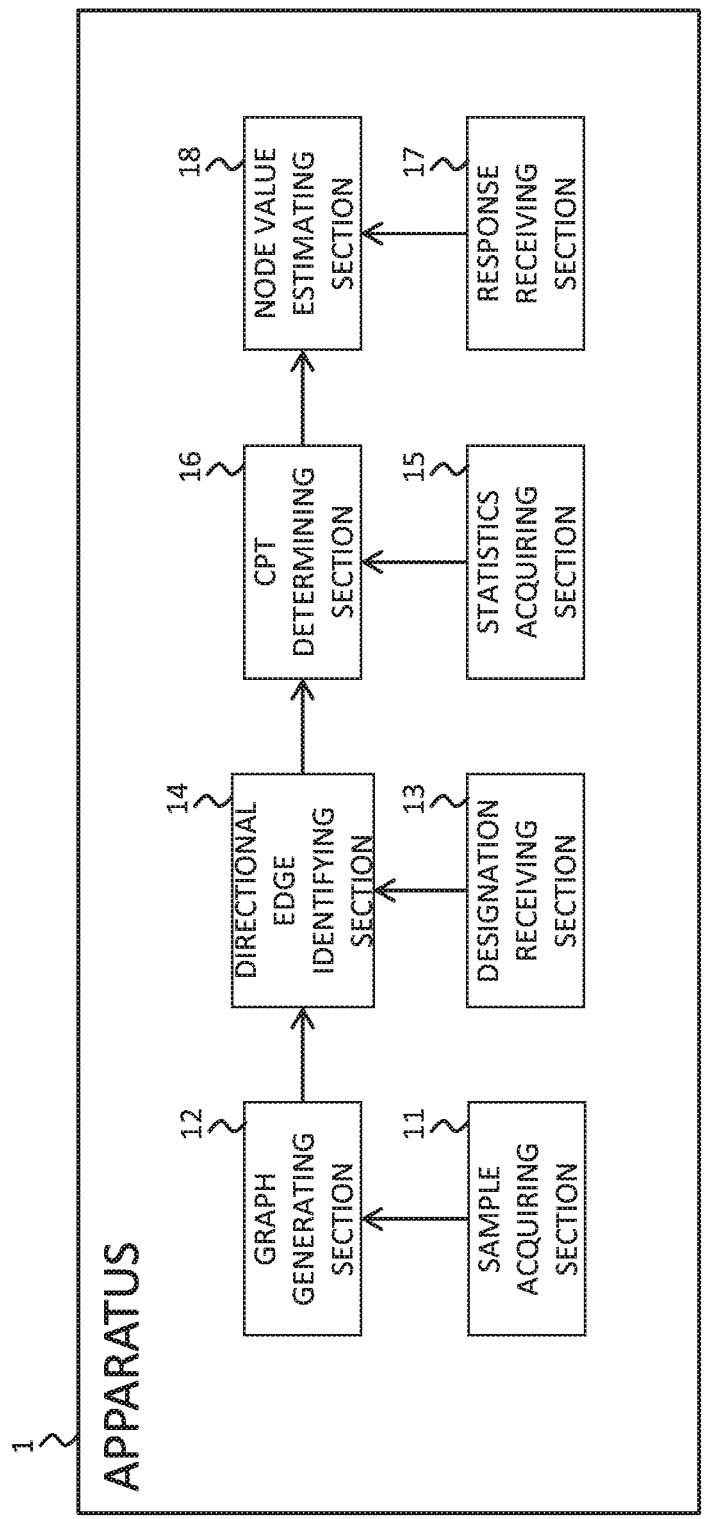
FIG. 1 shows an apparatus according to the present embodiment.

FIG. 1 shows an apparatus 1 according to the present embodiment. The apparatus 1 identifies a directional edge for which a conditional probability is to be acquired (referred to as a conditional probability acquisition edge), in a graph (a Bayesian network graph, as an example in the present embodiment) that includes a plurality of nodes corresponding to variables and a plurality of directional edges indicating the dependency relationship among node values. Here, a node value may be a predicted value of a variable, or may be expressed as a probability or probability distribution. The apparatus 1 includes a sample acquiring section 11, a graph generating section 12, a designation receiving section 13, a directional edge identifying section 14, a statistics acquiring section 15, a CPT (Conditional Probability Table) determining section 16, a response receiving section 17, and a node value estimating section 18.

The sample acquiring section 11 acquires a plurality of pieces of sample response data that are given as responses by a plurality of sample respondents in a statistical survey. The sample acquiring section 11 may supply the graph generating section 12 with the acquired sample response data.

The graph generating section 12 generates a graph based on the sample response data. The graph generating section 12 may supply the directional edge identifying section 14 with the generated graph.

The designation receiving section 13 receives a designation concerning types of a plurality of nodes in the graph. For example, the designation receiving section 13 may receive a designation of one or more estimation target nodes and one or more option nodes from an operator. The designation receiving section 13 may further receive a designation of one or more required, or input, nodes and/or one or more fixed nodes. The designation receiving section 13 may supply the directional edge identifying section 14 with the designation content.

Here, an estimation target node may be a node that is the target for a node value estimation, i.e. a so-called query node. A required, or input, node may be a node for which a node value is generated from data, and the node value may be always required, when estimating the value of an estimation target node. For example, the input node may be a node for which the variable is always an instance according to the input of a node value to the response receiving section 17 described further below, i.e. a node for which a node value (evidence) is always acquired. A fixed node may be a node that has a fixed node value. For example, the fixed node may be a node for which the variable is always an instance regardless of the input of a node value to the response receiving section 17, and may be a node concerning sex in a statistical survey that only targets men, as an example. An option node may be a node for which the node value is provided arbitrarily when estimating the value of an estimation target node.

The graph may include one or more nodes that are not any one of an estimation target node, an input node, a fixed node, and an option node. For example, the one or more nodes may be a no-evidence node for which a variable value is never obtained.

The directional edge identifying section 14 identifies one or more conditional probability acquisition edges for estimating each node value of one or more estimation target nodes, among a plurality of directional edges. The directional edge identifying section 14 may supply the CPT determining section 16 with identification information of the conditional probability acquisition edge.

The statistics acquiring section 15 acquires one or more pieces of statistical data. The statistics acquiring section 15 may supply the CPT determining section 16 with the acquired statistical data.

The CPT determining section 16 determines the conditional probability of each conditional probability acquisition edge, from the statistical data. For example, the CPT determining section 16 may determine a CPT of each conditional probability acquisition edge, and supply the node value estimating section 18 with these CPTs. Here, the plurality of pieces of sample response data used by the graph generating section 12 to generate the graph and the statistical data used by the CPT determining section 16 to determine the conditional probability may be obtained through separate statistical surveys. Accordingly, the attribute items in the sample response data for generating the graph do not need to match the question items of the statistical survey based on the statistical data used to determine the conditional probability, and one or more attribute items in the sample response data do not need to be included in the statistical data.

The response receiving section 17 receives the node value of each input node from one or more respondents, and arbitrarily receives the node values of one or more option nodes. These node values may be used as estimation conditions for the values of the estimation target nodes. The respondents providing the node values may be respondents to the statistical survey based on the statistical data acquired by the statistics acquiring section 15, respondents that provide responses by accessing the apparatus 1 via a network independently from the statistical survey, or an operator of the apparatus 1. The response receiving section 17 may supply the node value estimating section 18 with the received node values.

The node value estimating section 18 estimates the node value (the posterior probability) of each estimation target node. The node value estimating section 18 may estimate the node value using a conditional probability determined by the CPT determining section 16, based on the responses supplied from the response receiving section 17. The node value estimating section 18 may display the estimation result to the operator.

With the apparatus 1 described above, the conditional probability for the directional edge identified by the directional edge identifying section 14 is determined and the node value of the estimation target node is estimated using this conditional probability.

Figure 2:
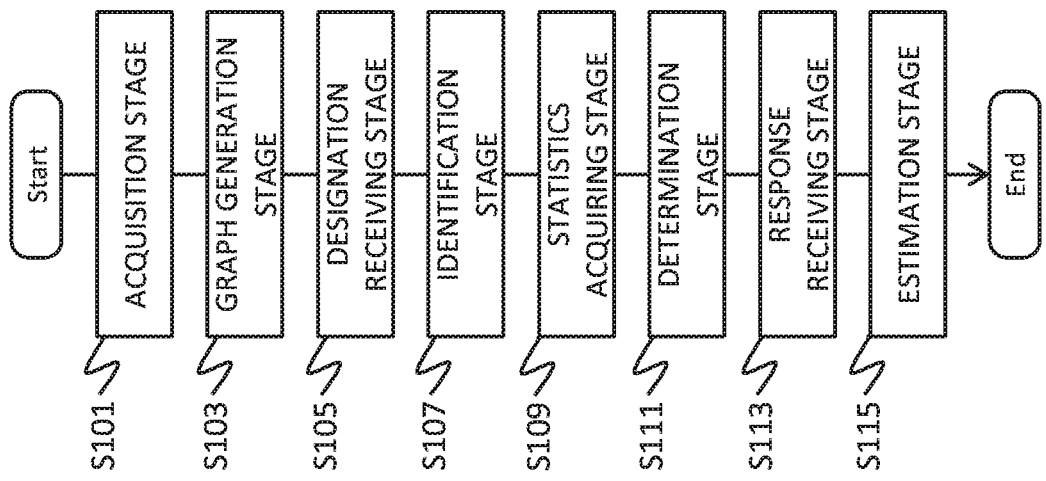
FIG. 2 shows a method according to the present embodiment.

FIG. 2 shows a method relating to the present embodiment. The apparatus 1 estimates the node value of the estimation target node by performing the processes from S101 to S115.

First, the sample acquiring section 11 may acquire a plurality of pieces of sample response data (step S101, acquisition stage). The plurality of pieces of sample response data acquired by the sample acquiring section 11 may be data acquired from the same statistical survey. Furthermore, the plurality of pieces of sample response data may be response data acquired from a plurality of sample respondents in a first domain Here, a domain may be a target range of a statistical survey, and may be a continent, country, geographical region, company, school, generation, community, or the like, for example. The response data may be created by converting each individual response used in the statistical survey into data for each respondent.

Next, the graph generating section 12 may generate a graph based on the sample response data (step S103, graph generation stage). For example, the graph generating section 12 may set each of a plurality of attribute items in the survey as a node, and calculate a graph structure that represents the dependency relationship among a plurality of node values from the trend of the probability variables or the like.

Next, the designation receiving section 13 may receive the designation concerning the types of a plurality of nodes in the graph (step S105, designation receiving stage). In the present embodiment, as an example, the designation receiving section 13 may receive, from the operator, a designation concerning whether each node among at least a portion of the plurality of nodes in the graph is an estimation target node, an input node, a fixed node, or an option node. Here, if one or more attribute items of the sample response data are not included in the statistical data, the nodes corresponding to these attribute items may be designated as fixed nodes.

Next, the directional edge identifying section 14 may identify one or more conditional probability acquisition edges for estimating the node value of each estimation target node (step S107, identification stage).

For example, the directional edge identifying section 14 may first may traverse the directional edges that can propagate an effect to a node value in either a forward direction or reverse direction (or both, as in the example of the present embodiment) from an estimation target node. As an example, the directional edge identifying section 14 may identify the next directional edge to be traversed based on whether a parent node or child node has just been traversed and/or whether the destination of the traversing is an input node, fixed node, option node, or the like. A directional edge that can propagate an effect to a node value may be a directional edge that connects two nodes among which one of the nodes has a value that can be changed (i.e. can have an effect propagated thereto) when the node value of the other node changes.

Furthermore, in the step of searching for a conditional probability acquisition edge, the directional edge identifying section 14 may identify one or more nodes (referred to as conditional probability acquisition nodes) for which a conditional probability is to be acquired for a directional edge between this node and another node for estimating the node value of an estimation target node Q. For example, since the conditional probability is a probability with the variable of a parent node as a condition, if the directional edge identifying section 14 traverses a directional edge to the parent node, the directional edge identifying section 14 may set the node immediately before this directional edge as a conditional probability acquisition node. However, the directional edge identifying section 14 does not need to set a directional edge directed toward a fixed node as a conditional probability acquisition node. This is because the effect on a node value is not propagated to a fixed node. The directional edge identifying section 14 may identify a directional edge as a conditional probability acquisition edge on a condition that this directional edge is directed toward a conditional probability acquisition node. The directional edge identifying section 14 may identify a directional edge that connects conditional probability acquisition nodes as a conditional probability acquisition edge.

Here, when a directional edge is traversed, if the node that is the destination of the traversing is an option node, the directional edge identifying section 14 may traverse both a directional edge that can propagate an effect if a node value is given to this option node and a directional edge that can propagate an effect if a node value is not given to this option node.

Furthermore, the directional edge identifying section 14 may traverse the directional edge of each child node of an option node and each directional edge from each parent node of an option node, in response to having traversed a directional edge from the child node of an option node to an option node. Furthermore, the directional edge identifying section 14 may traverse the directional edge of each child node of an option node and each directional edge from each parent node of an option node, in response to having traversed the directional edge from the parent node of an option node to an option node. The directional edge identifying section 14 does not need to traverse the directional edges from fixed nodes.

Furthermore, the directional edge identifying section 14 may traverse the directional edge from each parent node of an input node, in response to having traversed a directional edge from the parent node of an input node to an input node. On the other hand, the directional edge identifying section 14 does not need to traverse the directional edge between each child node and each parent node of an input node, in response to having traversed the directional edge from the child node of an input node to an input node.

After step S107 described above, the statistics acquiring section 15 may acquire one or more pieces of statistical data (step S109, statistics acquiring stage).

The one or more pieces of statistical data may be data obtained by aggregating response data from a plurality of sample respondents, or may be data obtained by analyzing the aggregated data. Furthermore, if the statistics acquiring section 15 acquires a plurality of pieces of statistical data, the plurality of pieces of statistical data may be data obtained separately from a plurality of statistical surveys.

Furthermore, if one or more attribute items of the sample response data for generating the graph are not included among the question items of the statistical survey serving as the basis for the statistical data for determining the conditional probability, the attribute values of these attribute items may be included in the statistical data as fixed values. For example, if an attribute item for sex is included in the sample response data and questions concerning gender are not included in the statistical survey because this statistical survey only targets males, an attribute value of a male may be included in association with the attribute item concerning sex in the statistical data of this statistical survey. The nodes corresponding to such attribute items may be fixed nodes, and these node values may be input during the designation receiving stage. Furthermore, by having the operator input the node values of the fixed nodes after the statistics acquiring section 15 has received the statistical data, these values may be included in the statistical data. If an attribute item of the sample response data for generating the graph and an attribute item of the statistical data do not match, the statistics acquiring section 15 may acquire a map showing the correspondence relationship from at least each conditional probability acquisition node among a plurality of nodes V in the graph generated by the graph generating section 12 to the attribute items in any one piece of statistical data.

The one or more pieces of statistical data may be data obtained from a statistical survey targeting a second domain. The second domain may be the same as the first domain, from which a plurality of pieces of sample response data used to generate the graph are obtained, or may be a separate domain. If the second domain is separate from the first domain, the graph structure may be the same between these two domains, and each node value may be different.

Next, the CPT determining section 16 may determine the conditional probability for each identified conditional probability acquisition edge (step S111, determination stage). The CPT determining section 16 may determine the conditional probability using the one or more pieces of statistical data supplied from the statistics acquiring section 15. For example, the CPT determining section 16 may calculate the conditional probability of a directional edge directed toward one conditional probability acquisition node among the one or more pieces of statistical data using this conditional probability acquisition node and the statistical data including all of the plurality of attribute items corresponding to each parent node that is not a fixed node. If such statistical data is not supplied from the statistics acquiring section 15, the CPT determining section 16 may notify the operator of this fact. In this case, the operator may acquire such statistical data by performing a new statistical survey, and may generate the statistical data from at least a reference number of pieces of the sample response data for generating the graph. The operator may then supply the CPT determining section 16 with the acquired statistical data via the statistics acquiring section 15. Instead, the operator may supply the CPT determining section 16 with conditional probabilities arbitrarily determined by the operator.

Next, the response receiving section 17 may receive the node value of each input node from a respondent as a response (step S113, response receiving stage). The response receiving section 17 may further arbitrarily receive node values of one or more option nodes as responses. For example, the response receiving section 17 may receive the node values of at least a portion of the one or more option nodes.

Next, the node value estimating section 18 may estimate the node value of each estimation target node using the conditional probabilities determined by the CPT determining section 16 (step S115, estimation stage). The node value estimating section 18 may estimate the node values based on the responses supplied from the response receiving section 17. For example, the node value estimating section 18 may estimate the node values of the estimation target nodes using the responses received by the response receiving section 17 as the node values of input nodes or option nodes, i.e. as evidence.

With the method described above, in the identification stage, upon arriving at an option node, a directional edge that can propagate an effect if a node value is provided to this option node and a directional edge that can propagate an effect if a node value is not provided to this option node are both traversed. Accordingly, the conditional probability acquisition node can be identified regardless of whether a node value is provided to the option node. Therefore, since it is possible to estimate the node value of an estimation target node without checking a node with a node value provided thereto, it is possible to simplify the estimation.

Furthermore, since the directional edge from a fixed node is not traversed when an option node is arrived at, it is possible to remove the time and effort of traversing directional edges that do not propagate an effect.

Since the directional edges between each parent node and each child node of an input node are not traversed in response to the directional edge from the child node of the input node to an input node being traversed, it is possible to remove the time and effort of traversing directional edges that do not propagate an effect.

If a directional edge to a parent node is traversed, this directional edge is identified as a conditional probability acquisition edge, on a condition that the node immediately before this directional edge is a conditional probability acquisition node and this directional edge is directed toward a conditional probability acquisition node. Accordingly, it is possible to avoid identifying a directional edge that does not propagate an effect to a node value from a parent node as a conditional probability acquisition edge, and to decrease the number of conditional probability acquisition edges.

Furthermore, the graph is generated using response data from a plurality of sample respondents of the first domain in the graph generation stage, and the conditional probabilities are determined using statistical data of the second domain in the determination stage. Accordingly, even if the graph cannot be generated because the statistical data can only be obtained in a statistical table format with limited attribute items in the statistical data of the second domain, it is possible to generate a graph that includes desired attribute items as estimation target nodes and to estimate the values thereof.

If one or more attribute items of the sample response data for generating the graph are not included in the statistical data for determining the conditional probabilities, the variables corresponding to these attribute items are set to fixed values. Accordingly, even if the attribute items do not match between the sample response data and the statistical data, it is possible to generate a graph that includes the desired attribute items as estimation target nodes and to estimate the values thereof.

Therefore, the above method quickly and efficiently determines desired attributes from sample response data and statistical data, and estimates values for the desired attribute by estimating the node value of an estimation target node. The node value of an estimation target node may correspond to a probability or a probability distribution of an attribute given particular sample response data and statistical data.

Figure 3:
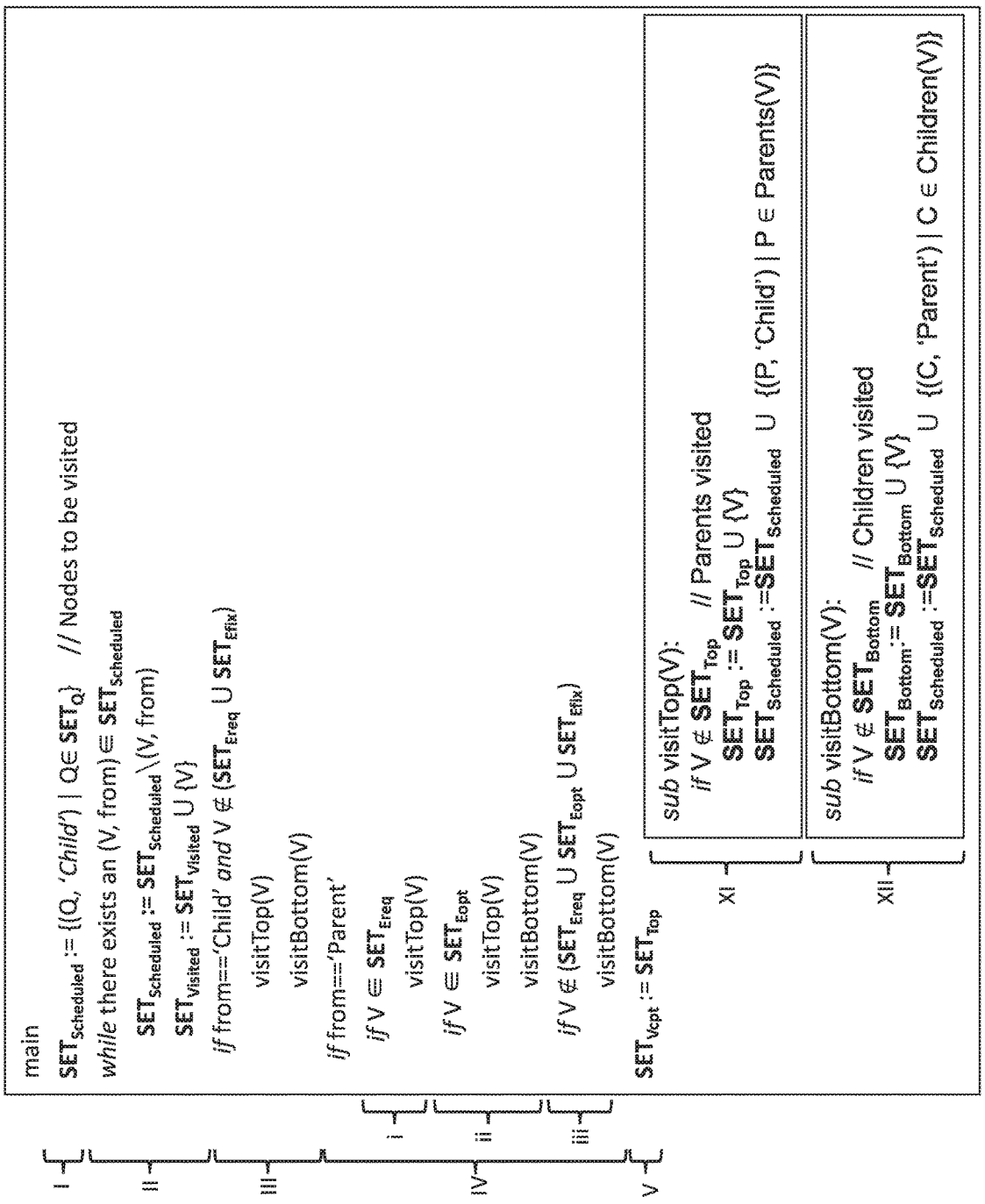
FIG. 3 shows an exemplary process in the identification stage.

FIG. 3 shows an exemplary process in the identification stage. The directional edge identifying section 14 may identify a conditional probability acquisition edge by performing the process of FIG. 3.

The bold characters in the drawing indicate sets. For example, $SET_Q$ includes one or more estimation target nodes Q. Furthermore, in the drawing, "(Q, 'Child')" indicates that the estimation target node Q has been traversed from a child node thereof. Furthermore, "(V, from)" indicates that the node V has been traversed from another node (a parent node or child node).

First, as shown in portion (I), the directional edge identifying section 14 sets $SET_{Scheduled}$ that includes one or more candidates of search target nodes for traversing a directional edge. For example, the directional edge identifying section 14 may set one or more estimation target nodes Q included in $SET_Q$ as the candidates for search target nodes in the processes of portions (II) to (IV), in $SET_{Scheduled}$. As an example in the present embodiment, in order to perform the search up to both a parent node and a child node of the estimation target node Q in the process of portion (III) described further below, the estimation target node Q is traversed from the child node, for convenience. The number of nodes included in $SET_{Scheduled}$ increase or decrease according to the processing described further below.

Next, as shown in portion (II), the directional edge identifying section 14 may judge whether there are one or more nodes V that have yet to be searched for in $SET_{Scheduled}$. If the judgment is affirmative, the directional edge identifying section 14 may set any one of these nodes V as a search target node V, and move this node from $SET_{Scheduled}$ to $SET_{Visited}$. Here, $SET_{Visited}$ is a set including one or more nodes that have already been visited. In this way, a search target node V may be marked as having been visited. The directional edge identifying section 14 may then proceed to the process of portion (III) or portion (IV) described further below, or the process of portion (II) may be repeated if there are no search target nodes V corresponding to portion (III) or portion (IV). If the judgment is negative, then there are no candidates for search target nodes, and therefore the directional edge identifying section 14 may proceed to the process of portion (V) described further below.

In the process of portion (III), the directional edge identifying section 14 traverses the search target node V from the child node, and performs the process if the node is neither an input node Ereq nor a fixed node Efix (e.g. if the node is an option node or no-evidence node). In this case, since the node value of the child node affects the node value of the parent node, the directional edge identifying section 14 may perform the subroutines of visitTop (V) and visitBottom (V) described further below. Here, $SET_{Ereq}$ in the drawing is a set including one or more input nodes Ereq, and $SET_{Efix}$ is a set including one or more fixed nodes Efix. If the search target node V is traversed from the child node and this node is an input node Ereq or a fixed node Efix, this means that the node values of the parent or other child nodes are not affected by the node value of the child node, and therefore the directional edge identifying section 14 does not need to perform the subroutines of visitTop (V) and visitBottom (V).

Furthermore, in the process of portion (IV), the directional edge identifying section 14 performs the process if the search target node V is traversed from the parent node. For example, the directional edge identifying section 14 may perform any one of the processes from portion (i) to portion (iii) described further below.

In the process of portion (i), the directional edge identifying section 14 perform the process if the search target node V is an input node Ereq. In this case, since there are cases where the node value of the parent node affects the node value of another parent node, the directional edge identifying section 14 may perform the subroutine of visitTop (V).

In the process of portion (ii), the directional edge identifying section 14 performs the process if the search target node V is an option node Eopt. Here, $SET_{Eopt}$ in the drawing is a set including one or more option nodes Eopt. In this case, since there are cases where the node value of the parent node affects the node value of another parent node or child node, the directional edge identifying section 14 may perform the subroutines of visitTop (V) and visitBottom (V).

In the process of portion (iii), the directional edge identifying section 14 perform the process if the search target node V is neither an input node Ereq, nor an option node Eopt, nor a fixed node Efix (e.g. if the search target node V is an no-evidence node). In this case, since there are cases where the node value of the parent node affects the node value of a child node, the directional edge identifying section 14 may perform the subroutine of visitBottom (V). If the search target node V is traversed from the parent node and this node is a fixed node, the node value of the child node is not affected by the node value of the parent node, and therefore the directional edge identifying section 14 does not need to perform the subroutines of visitTop (V) and visitBottom (V).

Here, in the visitTop (V) subroutine, the parent node is included in a visit target as shown in portion (XI). In this subroutine, the directional edge identifying section 14 may judge whether the search target node V is entered into $SET_{Top}$, i.e. whether the parent node has already been visited. Here, $SET_{Top}$ is a set including nodes V for which the parent nodes are to be traversed from these nodes V, and as an example in the present embodiment includes nodes V for which the visitTop (V) subroutine has been performed. If this judgment is negative, this means that the visitTop (V) subroutine has already been performed for the search target node V, and therefore the directional edge identifying section 14 may end the subroutine. If the judgment is affirmative, the directional edge identifying section 14 may add the search target node V to $SET_{Top}$. In this way, the search target node V may be marked as having the visitTop (V) subroutine performed thereon. Furthermore, the directional edge identifying section 14 may add all of the parent nodes P of the search target node V to $SET_{Scheduled}$, in order to further search for conditional probability acquisition nodes.

Furthermore, in the visitBottom (V) subroutine, the child node is included in a visit target as shown in portion (XII). In this subroutine, the directional edge identifying section 14 may judge whether the search target node V is entered into $SET_{Bottom}$, i.e. whether the child node has already been visited. Here, $SET_{Bottom}$ is a set including nodes V for which the child nodes are to be traversed from these nodes V, and as an example in the present embodiment includes nodes V for which the visitBottom (V) subroutine has been performed. $SET_{Vcpt}$ includes the conditional probability acquisition nodes Vcpt. If the judgment is negative, this means that the visitBottom (V) subroutine has already been performed for the search target node V, and therefore the directional edge identifying section 14 may end the subroutine. If the judgment is affirmative, the directional edge identifying section 14 may add the search target node V to $SET_{Bottom}$. In this way, the search target node V may be marked as having the visitBottom (V) subroutine performed thereon. Furthermore, the directional edge identifying section 14 may add all of the child nodes C of the search target node V to $SET_{Scheduled}$, in order to further search for conditional probability acquisition nodes.

In the process of portion (V), the directional edge identifying section 14 may set $SET_{Top}$ as $SET_{Vcpt}$ and identify one or more conditional probability acquisition nodes Vcpt. The nodes V included in $SET_{Top}$ are nodes that were searched for in the process of traversing directional edges to parent nodes, and this is because the node values of these nodes are affected by the parent nodes. Then, on a condition that the directional edge is directed toward a node included in $SET_{Vcpt}$, the directional edge identifying section 14 may then identify this directional edge as a conditional probability acquisition edge.

With the processes described above, if an option node Eopt has been visited by traversing a directional edge, i.e. if the search target node V is an option node Eopt, the subroutines of visitTop (V) and visitBottom (V) are respectively performed in portion (III) and in portion (IV)(ii), and the parent nodes P and child nodes C of the search target node V are respectively added to $SET_{Scheduled}$. In this way, a directional edge that can propagate an effect if a node value is provided to an option node Eopt and a directional edge that can propagate an effect if a node value is not provided to an option node Eopt can both be traversed from this option node.

If a fixed node Efix has been visited, neither of the subroutines visitTop (V) and visitBottom (V) are performed in the processes of portion (III) and portion (IV). In this way, it is possible to avoid traversing the directional edges from a fixed node Efix.

If an input node Ereq is arrived at from a parent node, the visitTop (V) subroutine is performed in the process of portion (IV)(i). In this way, the parent node P of the input node Ereq are added to $SET_{Scheduled}$, and the directional edges from this parent node P to the input node Ereq can be traversed in the opposite direction. If the input node Ereq is arrived at from a child node, the visitBottom (V) and visitTop (V) subroutines are performed in the process of portion (III). In this way, it is possible to avoid traversing the directional edges from the input node Ereq.

In the visitTop (V) subroutine, the search target node V is added to $SET_{Top}$. In this way, if a directional edge is traversed to a parent node, the node immediately before this directional edge is added to $SET_{Top}$.

In the visitTop (V) subroutine, the subroutine is ended if the search target node V is in $SET_{Top}$, and in the visitBottom (V) subroutine, the subroutine is ended if the search target node V is in $SET_{Bottom}$. Accordingly, it is possible to avoid setting the same node as the search target node V a plurality of times and again adding the parent node or child node to $SET_{Scheduled}$. In the visitTop (V) and visitBottom (V) subroutines, nodes V that are included in $SET_{Visited}$ among the parent nodes and child nodes of the search target node V do not need to be added to $SET_{Scheduled}$. In this case, it is possible to avoid visiting the same node a plurality of times.

FIG. 4 shows exemplary processing results from the identification stage. Here, the left side of FIG. 4 is a graph in which the input nodes Ereq1 and Ereq2, estimation target nodes Q1 and Q2, option nodes Eopt1 and Eopt2, a fixed node Efix1, and no-evidence nodes V1 to V6 are connected by directional edges that are solid lines. This graph may be generated in the graph generation stage described above.

When the process of FIG. 3 is performed on this graph, as a result of traversing the parent nodes and/or child nodes in order from the estimation target nodes Q1 and Q2 as necessary, nodes with "T" affixed thereto are included in SET$_{Top}$, and therefore in SET$_{Vcpt}$, and the nodes with "V" affixed thereto are included in SET$_{Visited}$. As shown in the drawing, with the process of FIG. 3, it is possible to eliminate the time and effort of traversing the directional edges that do not propagate an effect, which in the present embodiment includes the directional edge from the no-evidence node V4 to the input node Ereq2 and the like, for example.

The right side of the drawing shows a graph in which, among the directional edges and nodes in the graph on the left side, conditional probability acquisition edges and conditional probability acquisition nodes for estimating the node values of the estimation target nodes Q1 and Q2 are shown by solid lines. This graph is generated by showing only the conditional probability acquisition nodes with "T" affixed thereto and the directional edges connecting these conditional probability acquisition nodes, among the nodes in the graph on the left side, with solid lines. As shown in the drawing, with the process of FIG. 3 it is possible to reduce the number of directional edges that are to acquire a conditional probability.

FIG. 5 shows the principles of the identification stage. More specifically, FIG. 5 shows a combination of graph structures including three nodes A, B, and C, information indicating whether there is evidence for the variable of node B, information indicating whether an effect is propagated to the node value (i.e. whether there is a change in the node value), the propagation source, and the propagation destination.

Here, the graph structures shown in the drawing include Bayesian networks in which A is connected to B and B is connected to C, but A and C are not connected to each other. These graph structure represent three types, which are serial, diverging, and converging. For example, in the serial structure, there is a relationship by which the node value of the child node B is determined according to the conditional probability defined between A and B, based on the node value of the parent node A, and the node value of the grandchild node C is determined according to the conditional probability defined between B and C, based on the node value of the child node B. In the diverging structure, there is a relationship by which the node value of the child node A is determined according to the conditional probability defined between A and B, based on the node value of the parent node B, and the node value of the other child node C is determined according to the conditional probability defined between B and C. In the converging structure, there is a relationship by which the node value of the child node B is determined according to the conditional probability defined between A and B, based on the node value of the parent node A, and the node value of the other child node B is also determined according to the conditional probability defined between B and C, based on the node value of the other parent node C.

Among these, in the serial graph structure, if there is no evidence (node value) for the variable of the node B, an effect is propagated to the node values (see numbers 1 and 2) from A to C or from C to A, according to the conditional probability. On the other hand, if there is evidence for the variable of the node B, the variables of the nodes A and C do not depend on each other, and therefore an effect is not propagated to the node values (see numbers 3 and 4).

In the same manner, in the diverging graph structure, if there is no evidence for the variable of the node B, an effect is propagated to the node values (see number 5) from A to C or from C to A, according to the conditional probability. Furthermore, if there is evidence for the variable of the node B, the variables of the nodes A and C do not depend on each other, and therefore an effect is not propagated to the node values (see number 6).

In the converging graph structure, if there is no evidence for the variable of the node B, the variables of the nodes A and C do not depend on each other, and therefore an effect is not propagated to the node values (see number 7) from A to C or from C to A, according to the conditional probability. On the other hand, if there is evidence for the variable of the node B, an effect is propagated to the node values (see number 8) from A to C or from C to A, according to the conditional probability.

In a state where the node B is arrived at by traversing a directional edge from an estimation target node in a larger graph structure that includes graph structures such as described above, there following four cases can be imagined.

The first case is a case in which there is never evidence obtained for the variable of the node B, i.e. the node B is an no-evidence node.

In this case, the node value of the child node C propagates to the parent node A or another child node A (see numbers 1 and 5). Accordingly, in the process of FIG. 3, as shown in portion (III), if the search target node V is traversed from a child node and is an no-evidence node, visitTop (V) and visitBottom (V) are performed.

Furthermore, in this case, the node value of the parent node A propagates to the child node C (see number 2) and does not propagate to another parent node C (see number 7). Accordingly, in the process of FIG. 3, as shown in portion (IV), if the search target node V is traversed from a parent node and is a no-evidence node, visitTop (V) is not performed but visitBottom (V) is performed.

The second case is a case in which evidence is always obtained for the variable of the node B, i.e. the node B is an input node Ereq.

In this case, the node value of the child node C does not propagate to the parent node A or another child node A (see numbers 3 and 6). Accordingly, in the process of FIG. 3, as shown in portion (III), if the search target node V is traversed from a child node and is an input node Ereq, visitTop (V) and visitBottom (V) are not performed.

Furthermore, in this case, the node value of the parent node A is not propagated to the child node C (see number 4) but is propagated to another parent node C (see number 8). Accordingly, in the process of FIG. 3, as shown in portion (IV), if the search target node V is traversed from a parent node and is an input node Ereq, visitBottom (V) is not performed but visitTop (V) is performed.

The third case is a case in which the variable of the node B is fixed, i.e. the node B is a fixed node Efix. In this case, the node value of the child node C does not propagate to the parent node A or another child node A (see numbers 3 and 6), and the node value of the parent node A does not propagate to the child node C or another parent node (see number 4). Accordingly, in the process of FIG. 3, as shown in portion (III) and portion (IV), if the search target node V is traversed from one of a parent node and a child node and is a fixed node Efix, visitTop (V) and visitBottom (V) are not performed. Unlike the content of number 8, the node value of the parent node A not propagating to another parent node C is because, as a result of the value of the evidence for the node B always being determined to be 1, an effect on the node value does not propagate from A to C or from C to A.

The fourth case is a case in which evidence might be obtained for the variable of the node B, i.e. the node B is an option node Eopt. In this case, the node value of the child node C can propagate to the parent node A or another child node A (see numbers 1 and 5), and the node value of the parent node A can propagate to the child node C or another parent node C (see numbers 2 and 8). Accordingly, in the process of FIG. 3, as shown in portion (III) and portion (IV)(ii), if the search target node V is traversed from a child node or a parent node and is an option node Eopt, visitTop (V) and visitBottom (V) are performed.

In the manner described above, it is possible to eliminate the time and effort of traversing directional edges that do not propagate an effect.

FIG. 6 shows an exemplary process of the determination state. The CPT determining section 16 may determine the conditional probability of each conditional probability acquisition edge, by performing the process of FIG. 6.

First, as shown in portion (A), the CPT determining section 16 may set a map M(V) of each node V that is a conditional probability acquisition node VCPT to be m. Here, the map M(V) is a map indicating a correspondence relationship from one node in the graph generated by the graph generating section 12 to an attribute item (variable) in any one piece of statistical data (a statistical table T, as an example in the present embodiment) acquired by the statistics acquiring section 15.

Next, as shown in portion (B), the CPT determining section 16 may set the set of maps $M(V_1) \ldots, M(V_n)$ from the nodes $V_1, \ldots, V_n$ to the attribute items of the statistical table T to be $SET_m$. Here, the nodes $V_1, \ldots, V_n$ may be nodes other than fixed nodes Efix among the parent nodes of the node V.

Next, as shown in portion (C), The CPT determining section 16 calculates $SET_{T'}$ from $SET_T$, which is a set of one or more statistical tables T acquired by the statistics acquiring section 15. Here, $SET_{T'}$ is a set of one or more statistical tables T that includes, as an attribute item, a summation of the values of $SET_m$ (here, the map value, i.e. the attribute item) and the value of the map m (the attribute item), among the statistical tables T relating to $SET_T$.

Next, as shown in portion (D), if there is at least one statistical table T in $SET_{T'}$, the CPT determining section 16 may set the set of attribute items in one of these statistical tables T to be $SET_C$. Furthermore, the CPT determining section 16 may set the set of cells of this statistical table T (attribute values, as an example in the present embodiment) to be $SET_n$.

Next, as shown in portion (E), the CPT determining section 16 may calculate the conditional probability $p(m_k|SET_{ml})$ from Expression 1, for each combination of a value of the map m (attribute item) and $SET_{ml}$ that is a set of $SET_m$ values (attribute items) for the map of the parent nodes. The set of conditional probabilities $p(m_k|SET_{ml})$ for each combination does not need to be a conditional probability table (here, $p(m|SET_m)$).

Here, select($set_n$, $set_{ml}$), which is in the denominator on the right side, means selecting all cells in $SET_n$ for which $SET_{ml}$, which is the set of $SET_m$ values (attribute items), holds. For example, select($set_n$, $set_{ml}$) may be selecting all of the attribute values corresponding to the attribute items of the parent nodes in the statistical table T that includes all of the attribute items of the node V and each parent node thereof.

Accordingly, the denominator on the right side refers to a value obtained as the sum of select($set_n$, $set_{ml}$) for each attribute item other than the attribute items of the statistical table T mapped from the parent nodes to $SET_m$, from within $SET_C$ of the attribute items of the statistical table T.

Furthermore, select($SET_n$, ($\{m_k\} \cup SET_{ml}$)), which is in the numerator on the right side, means selecting all of the cells in $SET_n$ for which $SET_{ml}$, which is the set of $SET_m$ values (attribute items) and the value (attribute item) $m_k$ of the map m, holds. For example, select($SET_n$, ($\{m_k\} \cup SET_{ml}$)) may be selecting all of the attribute values corresponding to the attribute items of the node V and the parent nodes in the statistical table including all of the attribute items of the node V and each parent node thereof.

Accordingly, the numerator on the right side means a value obtained as the sum of select($SET_n$, ($\{m_k\} \cup SET_{ml}$)) for each attribute item other than the attribute items mapped from the parent nodes by $SET_m$ and the attribute items mapped from the node V by the map m, within $SET_C$ of the attribute items of the statistical chart T.

Then, as shown in portion (F), the CPT determining section 16 includes the calculated $p(m|SET_m)$ in $SET_{CPT}$ of CPTs.

With the process described above, it is possible to determine the conditional probabilities using statistical data of a domain differing from the domain of the sample response data used for generating the graph.

Figures 7A, 7B:
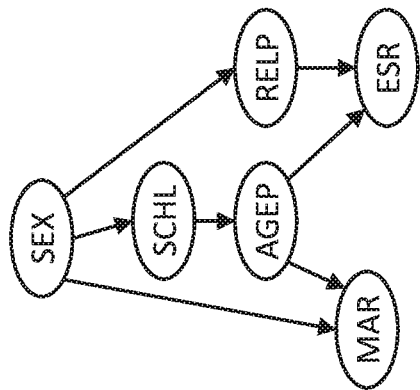
FIG. 7A shows an exemplary correspondence relationship between attribute items of the sample response data and attribute items of one or more pieces of statistical data.
FIG. 7B shows a graph generated using the sample response data of FIG. 7A.

FIG. 7A shows an exemplary correspondence relationship between attribute items of the sample response data and attribute items of one or more pieces of statistical data. For example, the sample response data may be data for generating the graph, and may be individual data from a statistical survey conducted in the United States (e.g. the American Community Survey 2013). The one or more pieces of statistical data may be data for determining the conditional probabilities, and may be data from a statistical survey conducted in Japan (e.g. a census, basic employment structure survey, or the like). As an example in the present embodiment, sample response data of a statistical survey from the United States performed in Japan and statistical data of a statistical survey from Japan may be unobtainable. The correspondence relationship for each section is used as the map M in the process of the determination stage.

FIG. 7B shows a graph generated using the sample response data of FIG. 7A. As an example in the present embodiment, the dependency relationship among attribute items such as marriage, age, and sex may be the same in the United States and Japan. Therefore, this graph may be operable to be applied to Japan.

FIG. 8 shows exemplary statistical data. This statistical data may be data of a statistical survey in Japan. As an example in the present embodiment, responses are gathered into groups according to male/female, age ranges each spanning 4 years, and the like in the statistical data. Therefore, it may be impossible to generate a graph using variables such as sex and age from the statistical data.

FIG. 9 shows an exemplary calculation of Expression 1 in the determination stage. With this example, the conditional probability of the directional edge directed toward the node of marital status (MAR) in the graph of FIG. 7B may be determined based on the statistical data of FIG. 8.

FIG. 10 shows an exemplary conditional probability table determined in the determination stage. This conditional probability table may be calculated using the mathematical expressions of FIG. 9.

In the present embodiment described above, a description is provided in which the apparatus 1 includes the sample acquiring section 11 and the graph generating section 12, but the apparatus 1 does not need to include these components. In this case, instead of acquiring a plurality of pieces of sample response data and generating the graph, the apparatus 1 may acquire a graph that has already been generated manually or by processing by another apparatus.

Figure 11:
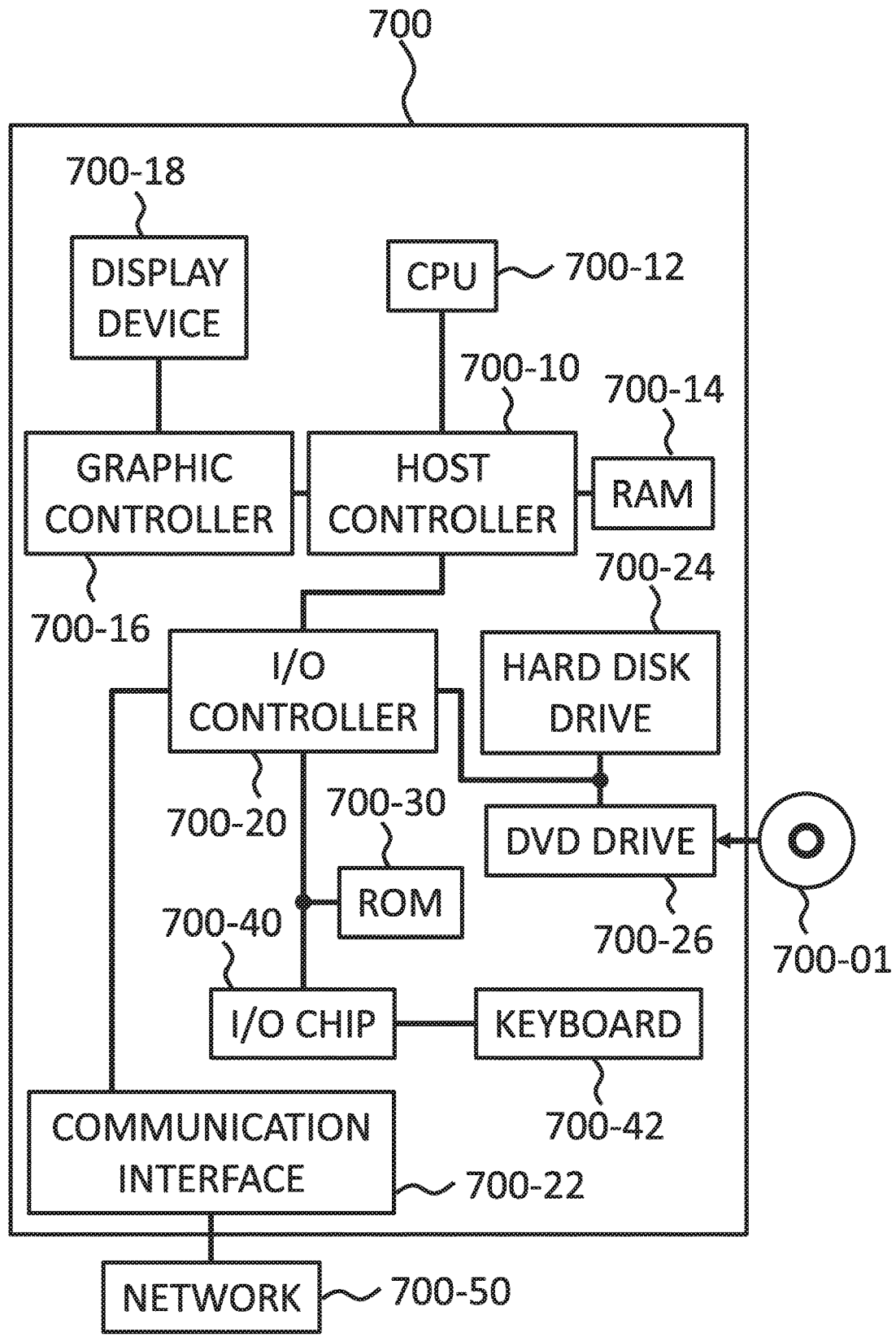
FIG. 11 shows an exemplary hardware configuration of a computer according to the embodiment of the invention.

FIG. 11 shows an exemplary hardware configuration of a computer configured to perform the foregoing operations, according to an embodiment of the present invention. A program that is installed in the computer 700 can cause the computer 700 to function as or perform operations associated with apparatuses of the embodiments of the present invention or one or more sections (including modules, components, elements, etc.) thereof, and/or cause the computer 700 to perform processes of the embodiments of the present invention or steps thereof. Such a program may be executed by the CPU 700-12 to cause the computer 700 to perform certain operations associated with some or all of the blocks of flowcharts and block diagrams described herein.

The computer 700 according to the present embodiment includes a CPU 700-12, a RAM 700-14, a graphics controller 700-16, and a display device 700-18, which are mutually connected by a host controller 700-10. The computer 700 also includes input/output units such as a communication interface 700-22, a hard disk drive 700-24, a DVD-ROM drive 700-26 and an IC card drive, which are connected to the host controller 700-10 via an input/output controller 700-20. The computer also includes legacy input/output units such as a ROM 700-30 and a keyboard 700-42, which are connected to the input/output controller 700-20 through an input/output chip 700-40.

The CPU 700-12 operates according to programs stored in the ROM 700-30 and the RAM 700-14, thereby controlling each unit. The graphics controller 700-16 obtains image data generated by the CPU 700-12 on a frame buffer or the like provided in the RAM 700-14 or in itself, and causes the image data to be displayed on the display device 700-18.

The communication interface 700-22 communicates with other electronic devices via a network 700-50. The hard disk drive 700-24 stores programs and data used by the CPU 700-12 within the computer 700. The DVD-ROM drive 700-26 reads the programs or the data from the DVD-ROM 700-01, and provides the hard disk drive 700-24 with the programs or the data via the RAM 700-14. The IC card drive reads programs and data from an IC card, and/or writes programs and data into the IC card.

The ROM 700-30 stores therein a boot program or the like executed by the computer 700 at the time of activation, and/or a program depending on the hardware of the computer 700. The input/output chip 700-40 may also connect various input/output units via a parallel port, a serial port, a keyboard port, a mouse port, and the like to the input/output controller 700-20.

A program is provided by computer readable media such as the DVD-ROM 700-01 or the IC card. The program is read from the computer readable media, installed into the hard disk drive 700-24, RAM 700-14, or ROM 700-30, which are also examples of computer readable media, and executed by the CPU 700-12. The information processing described in these programs is read into the computer 700, resulting in cooperation between a program and the above-mentioned various types of hardware resources. An apparatus or method may be constituted by realizing the operation or processing of information in accordance with the usage of the computer 700.

For example, when communication is performed between the computer 700 and an external device, the CPU 700-12 may execute a communication program loaded onto the RAM 700-14 to instruct communication processing to the communication interface 700-22, based on the processing described in the communication program. The communication interface 700-22, under control of the CPU 700-12, reads transmission data stored on a transmission buffering region provided in a recording medium such as the RAM 700-14, the hard disk drive 700-24, the DVD-ROM 700-01, or the IC card, and transmits the read transmission data to network 700-50 or writes reception data received from network 700-50 to a reception buffering region or the like provided on the recording medium.

In addition, the CPU 700-12 may cause all or a necessary portion of a file or a database to be read into the RAM 700-14, the file or the database having been stored in an external recording medium such as the hard disk drive 700-24, the DVD-ROM drive 700-26 (DVD-ROM 700-01), the IC card, etc., and perform various types of processing on the data on the RAM 700-14. The CPU 700-12 may then write back the processed data to the external recording medium.

Various types of information, such as various types of programs, data, tables, and databases, may be stored in the recording medium to undergo information processing. The CPU 700-12 may perform various types of processing on the data read from the RAM 700-14, which includes various types of operations, processing of information, condition judging, conditional branch, unconditional branch, search/replace of information, etc., as described throughout this disclosure and designated by an instruction sequence of programs, and writes the result back to the RAM 700-14. In addition, the CPU 700-12 may search for information in a file, a database, etc., in the recording medium. For example, when a plurality of entries, each having an attribute value of a first attribute is associated with an attribute value of a second attribute, are stored in the recording medium, the CPU 700-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 700. In addition, a recording medium such as a hard disk or a RAM provided in a server system connected to a dedicated communication network or the Internet can be used as the computer readable media, thereby providing the program to the computer 700 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, with the embodiments of the present invention, it is possible to easily estimate the node values of estimation target nodes.

What is claimed is:

1. A non-transitory computer readable storage medium comprising a computer readable program for estimating node values, wherein the computer readable program when executed on a computer causes the computer to perform the steps of:
   acquiring a graph that includes a plurality of nodes and a plurality of directional edges indicating a dependency relationship among node values;
   receiving a designation of a input node for which a node value is generated from collected data, an option node including an arbitrarily provided node value, and an estimation target node that is to be a target of an estimation of a node value, among the plurality of nodes; and
   identifying, using a processor, a directional edge for which a conditional probability is to be acquired to measure the node value of the estimation target node, from among the plurality of directional edges, by traversing a directional edge that can propagate an effect to a node value from the estimation target node, in at least one of a forward direction and a backward direction, wherein the identifying includes:
   for the option node, traversing both a directional edge that can propagate an effect if a node value is provided to the option node and a directional edge that can propagate an effect if a node value is not provided to the option node, and
   adding a node immediately before a directional edge to a parent node in a node set each time the directional edge to the parent node is traversed;
   displaying to an operator on a display device the node values of the estimation target nodes among the plurality of nodes, wherein the node values relate to probabilities or probability distributions of desired attributes in a belief network.

2. The computer readable storage medium according to claim 1, wherein
   the identifying includes, in response to having traversed a directional edge from a child node of the option node to the option node, traversing a directional edge from each parent node of the option node and traversing a directional edge to each child node of the option node.

3. The computer readable storage medium according to claim 2, wherein
   the identifying includes, in response to having traversed a directional edge from a parent node of the option node to the option node, traversing a directional edge from each parent node of the option node and traversing a directional edge to each child node of the option node.

4. The computer readable storage medium according to claim 1, wherein
   the receiving a designation includes further receiving a designation of a fixed node, which is a node with a fixed node value, and
   the identifying includes not traversing a directional edge from the fixed node.

5. The computer readable storage medium according to claim 1, wherein the identifying includes:
   on a condition that a directional edge is directed toward a conditional probability acquisition node in the node set, identifying the directional edge as a directional edge for which a conditional probability is to be acquired.

6. The computer readable storage medium according to claim 1, further comprising:
   acquiring statistical data; and
   determining the conditional probability of a directional edge identified as a directional edge for which a conditional probability is to be acquired.

7. A computer program product comprising the computer readable storage medium according to claim 1.

8. A computer comprising:
   the computer readable storage medium according to claim 1; and
   a processor that executes the program instructions.

* * * * *